Patented Oct. 22, 1929

1,732,512

UNITED STATES PATENT OFFICE

WINFRID HENTRICH, OF WIESDORF-ON-THE-RHINE, GERMANY, ASSIGNOR TO GENERAL ANILINE WORKS, INC., OF NEW YORK, N. Y., A CORPORATION OF DELAWARE

AZO DYESTUFFS

No Drawing. Application filed May 9, 1927, Serial No. 190,139, and in Germany May 19, 1926.

The present invention relates to new acid-mono-azo dyestuffs, which may be obtained by coupling a diazo compound of a 2.4.6-trinitro-1-aminobenzene or its substitution products with a sulphonic acid of the N-alkyl-, N-aryl,- or N-aralkyl-anilines, their homologues or substitution products, and which may be represented by the general formula:

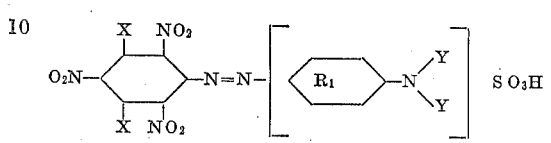

wherein X stands for hydrogen or alkyl, one Y for alkyl, aryl or aralkyl, the other Y for hydrogen, alkyl, aryl or aralkyl, and $R_1$ may be substituted or not.

My new dyestuffs are soluble in water, very stable against heat, fast to acids or dilute alkalis, and possess the valuable property of dyeing directly on acidyl celluloses or their conversion products. The dyeings on acetate silk are very fast to washing and to water and of outstanding fastness to light.

Example 228 parts by weight of 2.4.6-trinitro-1-aminobenzene are introduced at ordinary temperature into a quantity of nitrosyl sulphuric acid, prepared in the customary manner from 1000 volumes of sulphuric acid monohydrate and 70 parts by weight of dry 100% sodium nitrite. The whole is heated with stirring to about 40° C. with effective exclusion of moisture until a test portion poured on ice no longer shows the presence of nitrous acid. A solution of 305 parts by weight of N-ethyl-N-4'-sulphobenzyl-3-toluidine

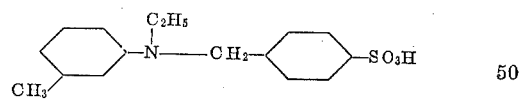

in about 3000 volumes of sulphuric acid monohydrate is then introduced at 0° C. and stirring is continued for some time. On causing the yellowish solution thus obtained to drop with brisk stirring slowly into a large quantity of ice-water, which advantageously contains a little sodium sulphate, the reddish blue dyestuff acid is immediately precipitated in a state, allowing easy filtration. The following formula represents the new dyestuff:—

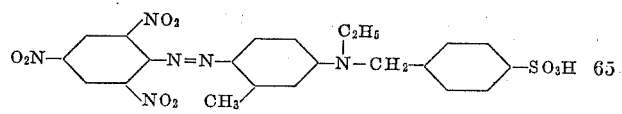

When the reaction is complete the dyestuff is soon filtered, washed with a little water and converted into the sodium or ammonium salt (by means of sodium carbonate or ammonia) in the customary manner at slightly increased temperature. After drying at about 90° C. the dyestuff represents a powder with a coppery lustre and is easily soluble in water with a reddish blue coloration soluble in concentrated sulphuric acid with orange red color. When giving its sulphuric acid solution on ice, the original dyestuff is obtained. It dyes acetate silk in a neutral Glauber salt bath or in a bath rendered acid with acetic acid in marine blue shades fast to washing, to water and of very good fastness to light. It dyes wool in an acid bath in bluish black shades.

By replacing in the above example N-ethyl-N-4'-sulphobenzyl-3-toluidine by N-methyl-N-4'-sulphobenzyl aniline a dyestuff is obtained which dyes acetate silk in strong bluish violet shades, possessing the same fastness properties. The employment of N-4'-sulphobenzyl-2-toluidine, N-benzyl-aniline-2-sulphonic acid, N-dimethylaniline-3-sulphonic acid or a diphenyl amino mono sulphonic acid as coupling components leads to the production of dyestuffs of similar properties. Likewise the application of 3-methyl-2.4.6-trinitro 1-aminobenzene instead of the amide of picric acid produces analogous results.

I claim:

1. New mono-azo dyestuffs of the formula

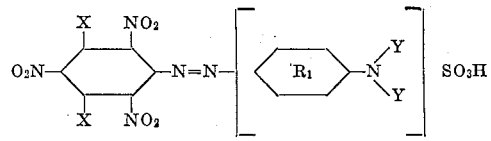

wherein X stands for hydrogen or alkyl, one Y for alkyl, aryl or aralkyl, the other Y for hydrogen, alkyl, aryl or aralkyl, and $R_1$ may be substituted or not, which are as sodium salts dark powders, soluble in water with violet to blue color, being very stable against heat, fast to acids or dilute alakalis, dyeing acetate silk violet to blue shades of excellent fastness to washing, to water and to light.

2. As new products azo dyestuffs of the general formula

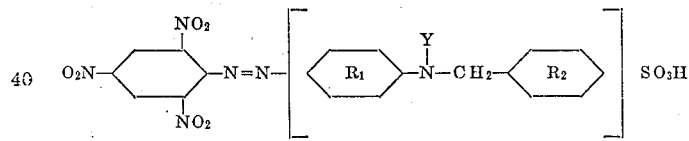

wherein $R_1$ and $R_2$ may be substituted or not and Y stands for hydrogen or an alkyl residue, which are as sodium salts dark powders, soluble in water with violet to blue color, being very stable against heat, fast to acids or dilute alkalis, dyeing acetate silk violet to blue shades of excellent fastness to washing, to water and to light.

3. As new products azo dyestuffs of the general formula

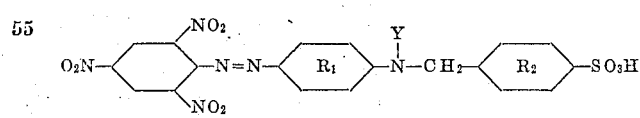

wherein $R_1$ and $R_2$ may be substituted or not and Y stands for an alkyl residue, which are as sodium salts dark powders, soluble in water with violet to blue color, being very stable against heat, fast to acids or dilute alkalis, dyeing acetate silk violet to blue shades of excellent fastness to washing, to water and to light.

4. A new dyestuff of the formula

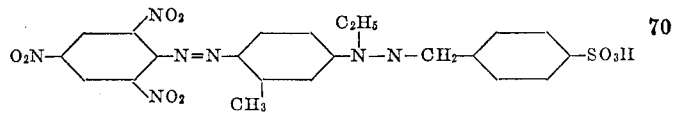

which is in a dry state a dark powder with a coppery lustre, easily soluble in water with a reddish blue coloration soluble in concentrated sulphuric acid with orange red color dyeing acetate silk in marine blue shades fast to washing, to water and to light, dyeing wool in an acid bath in bluish black shades.

In testimony whereof I have hereunto set my hand.

WINFRID HENTRICH.

Certificate of Correction

Patent No. 1,732,512. Granted October 22, 1929, to

WINFRID HENTRICH

It is hereby certified that error appears in the printed specification of the above-numbered patent requiring correction as follows: Page 2, line 70, strike out the formula and insert instead and that the said Letters Patent should be read with this correction therein that the same may conform to the record of the case in the Patent Office.

Signed and sealed this 5th day of December, A. D. 1929.

[SEAL]

M. J. MOORE,
*Acting Commissioner of Patents.*